United States Patent [19]

Speicher

[11] Patent Number: 5,023,437

[45] Date of Patent: * Jun. 11, 1991

[54] BAR CODE MARKING THE SURFACE OF AN OBJECT

[75] Inventor: Edwin W. Speicher, Pittsburgh, Pa.

[73] Assignee: M. E. Cunningham Company, Ingomar, Pa.

[*] Notice: The portion of the term of this patent subsequent to Mar. 7, 2006 has been disclaimed.

[21] Appl. No.: 312,585

[22] Filed: Feb. 15, 1989

Related U.S. Application Data

[63] Continuation of Ser. No. 11,061, Feb. 4, 1987, Pat. No. 4,810,867.

[51] Int. Cl.$^5$ ............................................. G06F 3/12
[52] U.S. Cl. .................................. 235/432; 235/494; 400/121; 101/93.04
[58] Field of Search ............... 235/432, 454, 462, 494; 400/121, 124; 101/93.04, 93.05

[56] References Cited

U.S. PATENT DOCUMENTS

| | | | |
|---|---|---|---|
| 4,591,279 | 5/1986 | Speicher | 400/121 |
| 4,630,067 | 12/1986 | Teraoka | 235/432 X |
| 4,641,018 | 2/1987 | Mazumder et al. | 235/494 X |
| 4,824,266 | 4/1989 | Fujii et al. | 400/121 X |

Primary Examiner—David Trafton
Attorney, Agent, or Firm—Stanley J. Price, Jr.

[57] ABSTRACT

A plurality of individual marks are imprinted in the surface of an object to form a plurality of substantially linear, rectangular arrays of preselected width in the surface of the object. Each imprinted substantially linear, rectangular array is spaced a preselected distance from each adjacent imprinted, substantially linear, rectangular array to provide a space of preselected width. The preselected width substantially linear, rectangular arrays and preselected width spaces are combined in alternating fashion to provide a bar code message in the surface of the object.

8 Claims, 2 Drawing Sheets

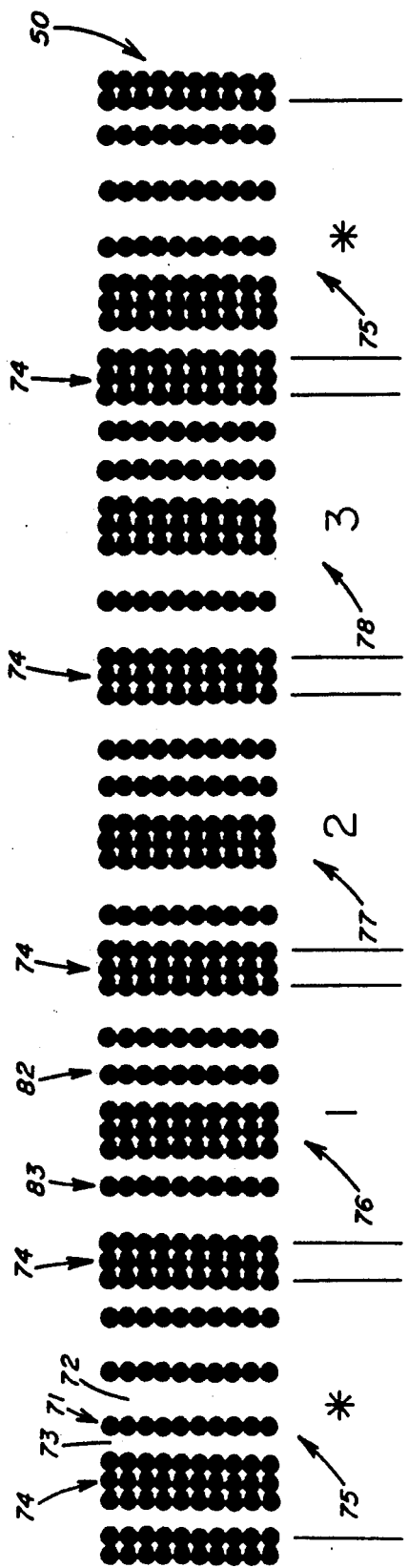
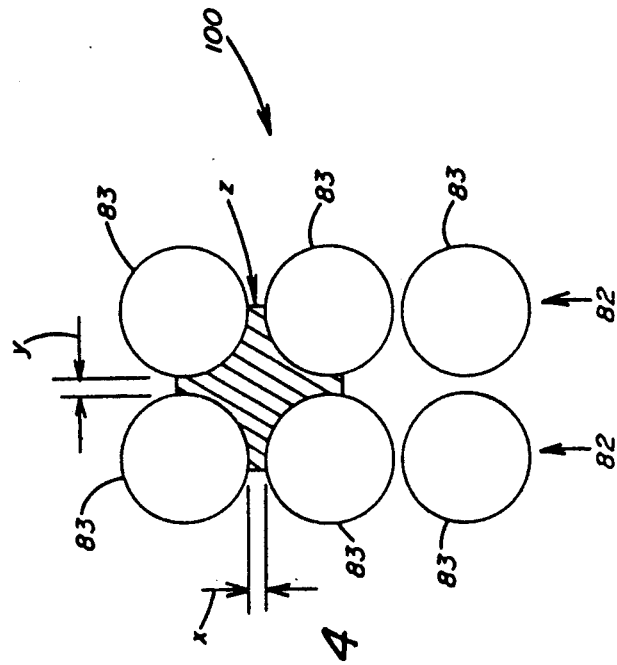
FIG. 3
FIG. 4

BAR CODE MARKING THE SURFACE OF AN OBJECT

CROSS REFERENCE TO RELATED APPLICATIONS

The application is a continuation of copending application Ser. No. 011,061, now U.S. Pat. No. 4,510,867, filed on Feb. 4, 1987, entitled, "Bar Code Marking The Surface Of An Object" by Edwin W. Speicher.

BACKGROUND OF THE INVENTION

1. Field of the Invention

This invention relates to a method for marking the surface of an object, and more particularly, to a method for selectively imprinting a plurality of individual marks in the surface of an object to form a bar code message in the surface of the object.

2. Description of the Prior Art

Utilizing a dot matrix marking device that includes a plurality of individual marking pins to imprint alphanumeric characters in the surface of a workpiece is well known.

British Pat. No. 2,002,694 discloses a programmable dot matrix type of engraver that is operable to imprint a selected size of alphanumeric characters into the surface of a workpiece. An engraving tool is supported on an arm which is movable on a carriage by a lead screw rotated by a stepping motor. The carriage is movably mounted on a horizontal arm that is, in turn, supported by a vertical column above a base on which the workpiece to be marked is stationarily positioned. With this arrangement, the engraving tool is movable along horizontal x and y axes. The engraving tool includes a punch which is remotely controlled by a central processing unit through a solenoid operated air valve to imprint the desired alphanumeric character into the surface of a workpiece.

U.S. Pat. No. 4,506,999 discloses a pneumatically controlled apparatus that includes an array of seven pins that are selectively operated to imprint alphanumeric characters in a workpiece. The seven pins are moved across the workpiece to selectively mark the workpiece with the desired alphanumeric characters. The angular arrangement of the pins determines the height of the characters and rotation of the head adjusts the angle of the line of pins.

While it has been suggested by the prior art devices to utilize a plurality of marking pins to imprint a plurality of individual marks in the surface of a workpiece to form an alphanumeric character message thereon, there is a need for a method of utilizing a plurality of marking pins to imprint a plurality of individual marks in the surface if a workpiece to provide a bar code message in the surface of the workpiece. The bar code message must be imprinted in the surface of the workpiece in such a manner that the message is capable of being read by standard, commercially obtainable bar code reading devices.

SUMMARY OF THE INVENTION

In accordance with the present invention there is provided a method for imprinting a bar code message in the surface of an object that includes the step of imprinting a plurality of individual marks in the surface of the object arranged to form a plurality of substantially linear, rectangular arrays of preselected width.

Further in accordance with the present invention there is provided a method for spacing each imprinted substantially linear, rectangular array from each adjacent imprinted substantially linear, rectangular array a preselected distance on the surface of an object to provide a space of preselected width.

Additionally in accordance with the present invention there is provided a method for combining the preselected width substantially linear, rectangular arrays and the preselected width spaces between adjacent substantially linear, rectangular arrays in alternating fashion to provide a bar code message imprinted in the surface of an object.

Accordingly, the principal object of the present invention is to provide a method for imprinting in the surface of an object a plurality of individual marks arranged to form a plurality of preselected width, substantially linear, rectangular arrays.

Another object of the present invention is to provide a method for spacing each imprinted substantially linear, rectangular array from each adjacent substantially linear, rectangular array a preselected distance on the surface of an object to provide a space of preselected width.

An additional object of the present invention is to provide a method for combining preselected width substantially linear, rectangular arrays and preselected width spaces in alternating fashion to provide a bar code message imprinted in the surface of an object.

These and other objects of the present invention will be more completely disclosed and described in the following specification, the accompanying drawings and the appended claims.

BRIEF DESCRIPTION OF THE DRAWINGS

FIG. 3 is an illustration of a three-of-nine bar code message imprinted in the surface of an object that represents the alphanumeric message 123.

FIG. 4 is an enlarged view of a portion of an elongated width substantially linear, rectangular array.

DESCRIPTION OF THE PREFERRED EMBODIMENTS

Figures 1, 2:
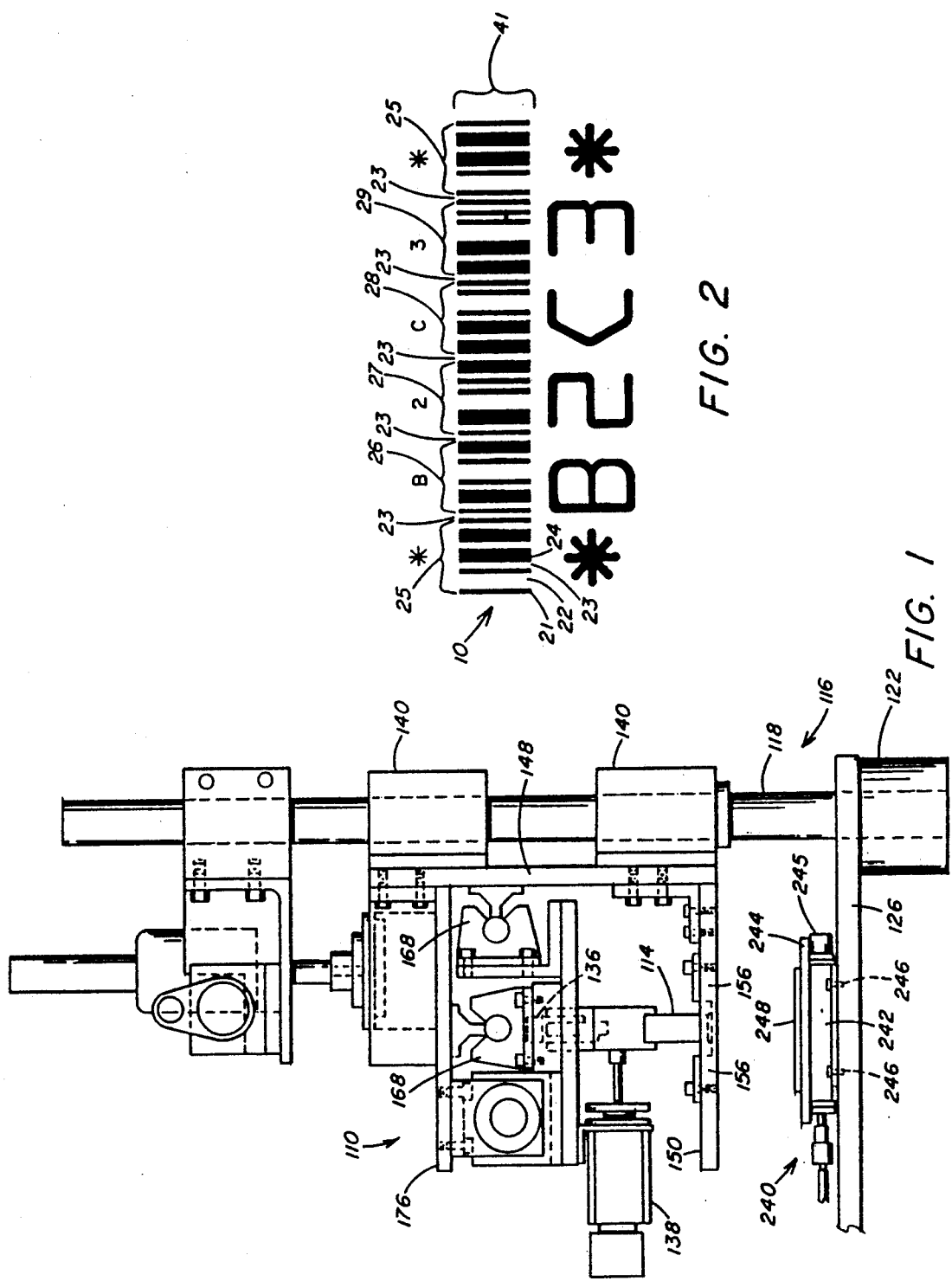
FIG. 1 is a view in side elevation of a marking machine illustrating a marking device supported on a base of the machine in vertical position for selective movement for imprinting a plurality of substantially linear, rectangular arrays in the surface of an object and a table assembly positioned on the marking machine fixed base member for supporting an object to be marked.
FIG. 2 is an illustration of a three-of-nine bar code message representing the alphanumeric message B2C3, reproduced from *American National Standard*, MH10.8M-1983, page 9.

Referring to FIG. 2 there is illustrated a bar code message generally designated by the numeral 10 which has been reproduced from *American National Standard* MH10.8M-1983, page 9. Bar code message 10 is an example of a typical bar code message that may be printed on a tag or label and affixed to an object for object identification purposes.

The bar code message generally designated by the numeral 10 is referred to in the bar code marking industry as a three-of-nine bar code pattern. A list of all alphanumeric characters capable of representation by a three-of-nine bar code pattern is illustrated in *American National Standard* MH10.8N-1983, page 10 (not shown).

As seen in FIG. 2, bar code message 10 is composed of an alternating series of bars and spaces. A bar may be of narrow width 21 or elongated width 24. A space may be of narrow width 23 or elongated width 22. Elongated width bar 24 and elongated width space 22 are of relatively equal width. Narrow width bar 21 and narrow width space 23 are also of relatively equal width.

Every narrow and elongated width bar and space illustrated in FIG. 2 is referred to as an element. The proper combination of nine elements represents an alpha or numeric character. The combination of nine elements 26 represents the letter B. Elements 27, 28 and 29 represent the alphanumeric characters 2, C and 3. Nine elements 25, which represent the character asterisk, are placed at the beginning and end of the bar code message to identify the start and stop of the bar code message. Any common symbol may be used for this purpose.

Since bar code message 10 is composed of three-of-nine characters, each of the characters 25–29 is composed of nine elements. Of the nine elements, five elements are bars and four elements are spaces. In a three-of-nine bar code pattern, three of the nine elements which make up any character are of elongated width and the remaining six elements are of narrow width. The nominal ratio of the width of an elongated element to the width of a narrow element should fall within the range of 2:1 to 3:1. Each nine element character is separated from each adjacent nine element character by narrow width space 23. Although a narrow width space 23 is used in FIG. 2 to separate adjacent characters, an elongated width space can also be used with identical results. Element height, generally designated by the numeral 41, can be varied to suit particular application requirements.

As previously mentioned, the bar code message generally designated by the numeral 10 in FIG. 2 may be printed on a tag or label and affixed to an object by suitable means.

A bar code message which is imprinted directly in the surface of an object is illustrated in FIG. 3. The bar code message generally designated by the numeral 50 in FIG. 3 is imprinted directly in the surface of an object to, among other things, simplify the bar code marking process and eliminate the problems associated with lost or damaged bar coded tags and labels. Bar code message 50 may be imprinted directly into the surface of many types of objects that include production line items, such as slabs, rolled stock and the like, as well as plates, round and various tags, components and parts fabricated of material which may be comprised of glass, metal or plastic.

The bar code message generally designated by the numeral 50 in FIG. 3 which is imprinted in the surface of an object is composed of the three-of-nine bar code characters previously described. It should be understood that although FIG. 3 illustrates a three-of-nine bar code message imprinted in the surface of an object, a bar code message utilizing any standard bar code pattern may be imprinted with identical results. Bar code message 50 is composed of an alternating series of bars and spaces. A bar may be of narrow width 73 or elongated width 72. A space may be of narrow width 71 or elongated width 74.

As seen in FIG. 3, each narrow width space 71 and elongated width space 74 is comprised of a plurality of individual marks 83 arranged to form a substantially linear, rectangular array of preselected width in the surface of the object. Each substantially linear, rectangular array is referred to as an array. The width of the array imprinted in the surface of the object is controlled by selecting the number of columns 82 of individually imprinted marks 83 which make up the array. Each array, whether of narrow or elongated width, is imprinted in the surface of the object a preselected distance from each adjacent array to control the width of the bar element which is located between each pair of adjacent arrays. The bar element is represented by the spacing between adjacent arrays. For example, narrow width bar 73 and elongated width bar 72 in FIG. 3 correspond to narrow width bar 21 and elongated width bar 24 in FIG. 2. Similarly, narrow width space 71 and elongated width space 74 in FIG. 3 correspond to narrow width space 23 and elongated width space 22 in FIG. 2. Although the bar code message 50 shown in FIG. 3 illustrates all bar elements as preselected width spaces between adjacent arrays and all space elements as preselected width arrays, this is a matter of system designer choice. If desired, all bar elements may be comprised of preselected width arrays and all space elements may be comprised of the preselected width spaces between adjacent arrays.

As seen in FIG. 3, narrow width array 71, which represents a narrow width space, consists of one column 82 of nine individually imprinted marks 83. Elongated width array 74, which represents an elongated width space, consists of three columns 82 of nine individually imprinted marks 83. The selection of one column 82 of individually imprinted marks 83 for narrow width array 71 and three columns 82 of individually imprinted marks 83 for elongated width array 74 is a matter of system designer choice. As with any three-of-nine bar code pattern, the nominal ratio of the width of an elongated array to the width of a narrow array should fall within the range of 2:1 to 3:1. As seen, controlling the spacing between adjacent arrays controls the width of the bar between adjacent arrays. Each array is spaced a preselected distance from each adjacent array so that the ratio of the width of an elongated width bar to the width of a narrow width bar also falls within the range of 2:1 to 3:1.

As previously described, a space may be of narrow width as illustrated by array 71 or elongated width as illustrated by array 74. A bar may be of narrow width 73 or elongated width 72. The narrow width space illustrated by array 71 and narrow width bar 73 are of relatively equal width. Similarly, elongated width space illustrated by array 74 and elongated width bar 72 are of relatively equal width. As previously described, the width of the bars between adjacent arrays is controlled by controlling the distance between pairs of adjacent arrays imprinted in the surface of the object.

Each narrow and elongated width array space and bar illustrated in FIG. 3 is referred to as an element. As in any three-of-nine bar code pattern, nine elements comprise an alpha or numeric character. The combination of nine elements 76 represents the numeral 1. Elements 77 and 78 represent the numerals 2 and 3, respectively. The nine elements 75 represent the start and stop character asterisk. Each nine element character is separated from each adjacent nine element character by an elongated width array space 74.

As described, the bar code message 50 in FIG. 3 may be imprinted directly in the surface of an object to eliminate the need for bar coded tags or labels.

Referring to FIG. 4, there is illustrated an enlarged portion of an elongated width array generally designated by the numeral 100. Two columns 82 of individually imprinted marks 83 are shown. In order for elongated width array space element 74 shown in FIG. 3 to functionally represent elongated width space element 22 shown in FIG. 2, each individual mark 83 must be imprinted in the surface of the object so that the density of the individually imprinted marks 83 in elongated width array space element 74 is maximized.

To accomplish this, each individual mark 83 in elongated width array space element 74 must be imprinted in the surface of the object in at least a juxtaposed relation to every adjacent imprinted mark 83 in the array. Juxtaposed is here defined as to place side by side as in touching. At a minimum, to achieve optimum placement of the individual marks 83 in any particular column 82, each individual mark 83 in the column should be imprinted in abutting relation to each adjacent individual mark in the column. Similarly, to achieve optimum placement of the individual marks 83 in any particular row of marks 83 in elongated width space element 74, each individual mark 83 in a particular row should be imprinted in abutting relation to each horizontally adjacent individual mark 83 in the row. Preferably, all individually imprinted marks 83 in elongated width array space element 74 should be imprinted in the surface of the object to provide a preselected minimum amount of overlap between all vertically adjacent marks 83 and a preselected minimum amount of overlap between all horizontally adjacent marks 83. Imprinting all vertically and horizontally adjacent individual marks 83 in juxtaposed or overlapping relation will ensure that the density of the individually imprinted marks 83 in elongated width array space element 74 is maximized. Maximizing the density of the individually imprinted marks 83 in elongated width array space element 74 will provide an elongated width array space element 74 that functionally represents elongated width bar 24 shown in FIG. 2. Maximizing the density of the individually imprinted marks in array 74 decreases the possibility of detection errors when bar code message 50 is read by a standard commercially obtainable bar code reader device.

As seen in FIG. 4, when vertically adjacent individually imprinted marks 83 are not imprinted in the surface of the object in juxtaposed or overlapping relation, vertical dimension x between vertically adjacent imprinted marks 83 is produced. Similarly, when horizontally adjacent imprinted marks 83 are not imprinted in the surface of an object in juxtaposed or overlapping relation, horizontal dimension y between horizontally adjacent imprinted marks 83 is also produced. As both vertical dimension x and horizontal dimension y, appear in elongated width array 74, the density of the individually imprinted marks 83 in the elongated width array space element 74 is decreased. Also, as the vertical dimension x between vertically adjacent individually imprinted marks 83 and the horizontal dimension y between horizontally adjacent individually imprinted marks 83 increase, the area of shaded zone z increases. Shaded zone z represents an area of imperfection formed by and contained within four individually imprinted marks 83. As vertical dimension x, horizontal dimension y and the area shaded zone z increase, the density of the individual imprinted marks 83 in elongated width space element 74 is decreased. A decrease in the density of the individually imprinted marks 83 in elongated width array space element 74 may result in possible detection errors when the bar code is read by standard commercially obtainable bar code reading devices, since the bar code reading device may inadvertently interpret the spacing between individually imprinted marks 83 in elongated width array space element 74 as a bar element such as narrow width bar 73 or elongated width bar 72 shown in FIG. 3.

Referring to FIG. 3, it can be seen that the three columns 82 of individual marks 83 in elongated width array space element 74 are imprinted in the surface of an object in a substantially vertical position. Similarly, the one column 82 of individually imprinted marks 83 in narrow width array space element 71 is also imprinted in the surface of an object in a substantially vertical position. Every column 82 of individually imprinted marks 83 in either a narrow width array space element 71 or elongated width array or elongated width array space element 74 should be positioned substantially vertically in the surface of the object to ensure that the spacing between arrays, which represents a bar element, maintains a relatively rectangular shape. Maintaining the verticality of the individual columns 82 of individually imprinted marks 83 will also eliminate detection errors when the bar code is read by standard, commercially obtainable bar code reading devices.

An apparatus suitable for imprinting the bar code message 50 shown in FIG. 3 is illustrated in FIG. 1 and generally designated by the numeral 110. This suitable apparatus is also disclosed in U.S. Pat. No. 4,591,279, which patent is hereby incorporated by reference. Apparatus 110 is used to imprint in the surface of an object a plurality of individual marks 83 arranged in a plurality of substantially linear, rectangular arrays to produce bar code message 50.

As seen in FIG. 1, marking apparatus 110 is mounted for vertical movement on a support system generally designated by numeral 116 that includes a pair of spaced apart vertically extending posts, one shown at 118, which are supported by two pedestals, one shown at 122. Vertically extending posts 118 and support pedestals 122 connect marking apparatus 110 to fixed member 126. Marking device 114 is supported by a generally U-shaped support member consisting of intermediate plate portion 148, base plate portion 150, and support plate portion 176. Base plate portion 150 and support plate portion 176 extend from intermediate plate portion 148 in generally parallel spaced relation to each other. The U-shaped support member is slideably secured to vertical posts 118 by fastening means 140 in such a manner that base plate portion 150 extends substantially parallel to fixed member 126 horizontal surface. The U-shaped support member which supports marking device 114 moves vertically relative to fixed member 126 and can be positioned at any desired distance above fixed member 126.

Two guide means 168 secured to the generally U-shaped support member support marking device 114. Guide means 168 support marking device 114 as it is moved in a linear direction by drive means (not shown) relative to the generally U-shaped support member. Pivoting means 136 and indexing means 138 operate to allow marking device 114 to be pivoted in a horizontal plane relative to guide means 156 to provide a preselected angle between guide means 156 longitudinal axis and marking device 114 longitudinal axis. Varying this angle provides a means for adjusting the width and height of the plurality of rectangular arrays imprinted in the surface of an object. The angle between marking device 114 and guide means 156 should be adjusted so that, as marking device 114 operates, each individual mark 83 in each rectangular array is imprinted in the surface of an object in juxtaposed or overlapping relation to each adjacent individual mark 83 in the array.

Table assembly 240, also disclosed in U.S. Pat. No. 4,591,279 and hereby incorporated by reference, is mounted to fixed member 126. Table assembly 240 can be used in conjunction with marking apparatus 110 to provide multiple row marking on the surface of object 248. Table 240 stationery base assembly 242 is adapted to the bolted to fixed member 126 by bolting means 246 so that movable table assembly upper portion 244 reciprocates on an axis perpendicular to the direction of movement of marking device 114. An object to be marked 248 is placed on movable table assembly upper portion 244 and secured thereon by suitable means (not shown). Movable table assembly upper portion 244 has a drive means 245 which allows table assembly upper portion 244 to be positioned at a preselected location on stationary base assembly 242. Movable table assembly upper portion 244 and marking device 114 can be positioned at any preselected point along their respective axes of travel by suitable control means to imprint a plurality of spaced apart rectangular arrays at any desired location on the surface of object 248.

If it is desired to provide multiple row marking on the surface of object 248, marking device 114 is first operated to selectively imprint in the surface of object 248 a plurality of rectangular arrays selectively spaced from each other to represent, for example, bar code message 50 shown in FIG. 3. After marking device 114 has imprinted bar code message 50, marking device 114 drive means can be operated to communicate through suitable control means with movable table assembly upper portion 244 drive means to allow movable table assembly upper portion 244 to reciprocate a preselected distance perpendicular to the direction of movement of marking device 114. After movable table assembly upper portion 244 has reciprocated this further perpendicular distance, marking device 114 can be operated to imprint the alphanumeric equivalent of the bar code message or any desired message either above or beneath bar code message 50.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for imprinting a machine readable bar code message in the surface of an object comprising the steps of;
   providing an object,
   imprinting a plurality of marks by indenting the surface of said object and forming recesses therein, said plurality of marks arranged in a plurality of substantially linear, rectangular arrays in the surface of said object,
   spacing each imprinted substantially linear, rectangular array a preselected distance from each adjacent imprinted, substantially linear, rectangular array to provide a machine readable bar code message imprinted in the surface of each object, and
   positioning each of said marks so that the adjacent edges of each of said marks are in juxtaposition with each other to thereby maximize the density of said plurality of marks imprinted within each said substantially linear, rectangular array to minimize errors in reading said machine readable bar code message.

2. A method for imprinting a machine readable bar code message in surface of an object as set forth in claim 1 including;
   controlling the width of a substantially linear, rectangular array by selecting the number of columns of imprinted marks which make up said substantially linear, rectangular array.

3. A method for imprinting a machine readable bar code message in the surface of an object as set forth in claim 2 including;
   imprinting each mark within each said substantially linear, rectangular array to provide a preselected minimum amount of overlap between all vertically adjacent marks and a preselected minimum amount of overlap between all horizontally adjacent marks.

4. A method for imprinting a machine readable bar code message in the surface of an object as set forth in claim 2 including;
   controlling the spacing between any two adjacent substantially linear, rectangular arrays to obtain a space of preselected width.

5. A method for imprinting a machine readable bar code message in the surface of an object as set forth in claim 4 including;
   combining said preselected width substantially linear, rectangular arrays with said preselected width spaces in alternating fashion to provide a machine readable bar code message imprinted in the surface of said object.

6. A method for imprinting a machine readable bar code message in the surface of an object as set forth in claim 1 including;
   providing a marking device having a longitudinal axis to imprint said plurality of marks;
   providing guide means to movably suport said marking device, said guide means having longitudinal axis being in angular relationship with said marking device longitudinal axis; and
   adjusting said angular relationship between said guide means longitudinal axis and said marking device longitudinal axis to provide for maximal density of said plurality of marks imprinted within each said substantially linear, rectangular array in said machine readable bar code message.

7. A method for imprinting a machine readable bar code message in the surface of an object as set forth in claim 6 including,
   securely placing said object to be imprinted with a machine readable bar code message on a movable tabele assembly upper portion;
   positioning said movable table assembly upper portion and said marking device to imprint said machine readable bar code message at a preselected location on said object surface.

8. A method for imprinting a machine readable bar code message in the surface of an object as set forth in claim 7 including;
   reciprocally moving said movable table assembly upper portion a preselected distance perpendicular to the direction of movement of said marking device after said object has been imprinted with a machine readable bar code message, and
   imprinting an alphanumeric message on said object.

* * * * *